United States Patent Office 3,422,078
Patented Jan. 14, 1969

3,422,078
POLYMETHYLENIMINETHIOTHIAZOLES AND RUBBER VULCANIZATION
John J. D'Amico, Dunbar, W. Va., assignor to Monsanto Company, St. Louis, Mo., a corporation of Delaware
No Drawing. Filed Jan. 7, 1966, Ser. No. 519,297
U.S. Cl. 260—79.5                    12 Claims
Int. Cl. C08d *13/28;* C08c *11/54;* C07f *99/10*

ABSTRACT OF THE DISCLOSURE

Products of the formula

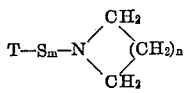

where T is a benzothiazolyl radical, $m$ is 1 or 2, and $n$ is 5 or 6 which accelerate the vulcanization of rubber.

---

The present invention relates to a new class of polymethyleniminethiothiazoles which are characterized as accelerators of the vulcanization of rubber possessing good scorch resisting properties. Many good rubber vulcanizing accelerators unfortunately are so active as to develop to varying extents some vulcanization of the rubber compound during preliminary mixing and handling steps where the rubber stock is subjected to temperatures somewhat below normal vulcanizing temperatures. Such characteristic is commonly known as scorching and such action results in the development of a finished product of somewhat inferior quality or, if scorching is severe, may result in ruining the rubber stock. Consequently, the availability of accelerators speedy in action in the cure but with retarding action during the handling steps is much to be desired.

The products of the present invention have the general formula

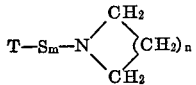

where T represents a benzothiazolyl group, $m$ is 1 or 2, and $n$ is 5 or 6. The benzothiazolyl group may be substituted, as for example, it may contain a nitro, chloro, alkyl, or alkoxy group in the benzene ring.

The preparation and properties of the new compounds are described in further detail below:

Example 1

A slurry was prepared by mixing 42.3 grams (0.25 mole) of 99% 2-mercaptobenzothiazole, 42.5 grams (0.375 mole) of heptamethylenimine (50% excess), and 300 ml. of isopropyl alcohol. After stirring the very thick slurry for 15 minutes at 45°–50° C., there was then added over a period of 90 minutes at 45°–50° C. 0.375 mole (50% excess) of sodium hypochlorite in the form of an aqueous solution containing 17.2 grams NaOCl per 100 ml. Upon addition of 50 ml. of water to dissolve by-product salt, two layers formed. The mixture was cooled to 10° C., then 5 grams of sodium sulfite were added followed by the addition of 1000 ml. of water in 10 minutes via a dropping funnel. Stirring was continued at 0°–10° C. for 30 minutes, the precipitate filtered off, washed with water until the washings were neutral to litmus, and air-dried at 25°–30° C. 2-(hexahydro-1(2H)-azocinylthio)benzothiazole was obtained in 99% yield as a light tan solid melting at 86°–87° C. after recrystallization from heptane and alcohol.

Analysis gave 10.02% nitrogen and 22.96% sulfur compared to 10.06% nitrogen and 23.03% sulfur calculated for $C_{14}H_{18}N_2S_2$.

Example 2

In the procedure of Example 1, an equimolar amount of octamethylenimine was substituted for the heptamethylenimine. The 2-(octahydro-1H-azonin-1-ylthio)benzothiazole was obtained in 86% yield as a light yellow solid melting at 58°–59° C. after recrystallization from heptane.

Analysis gave 9.64% nitrogen and 21.65% sulfur compared to 9.58% nitrogen and 21.93% sulfur calculated for $C_{15}H_{20}N_2S_2$.

Example 3

In this example the slurry comprised 50.4 grams (0.25 mole) of 5-chloro-2-mercaptobenzothiazole, 42.5 grams (0.375 mole) of heptamethylenimine, and 400 ml. of isopropyl alcohol. No layers formed upon addition of 50 ml. of water nor after heating the mixture at 45°–50° C. for an additional 30 minutes. The reaction mixture was filtered hot, the precipitate washed with 100 ml. of isopropyl alcohol, sucked dry, and then air-dried at 25°–30° C. The product melted at 93°–94° C. To the filtrate was added 5 grams of sodium sulfite and 2000 grams of ice-water and the mixture stirred at 0°–10° C. for 30 minutes. The precipitate was filtered off, washed with water until the washings were neutral to litmus, and air-dried at 25°–30° C. After recrystallization from alcohol of the combined products, the 5-chloro-2-(hexahydro-1(2H)-azocinylthio)benzothiazole thus obtained melted at 93°–94° C. The yield was 97.5% of an off-white solid analyzing 9.23% nitrogen and 20.16% sulfur compared to 8.95% nitrogen and 20.50% sulfur calculated for $C_{14}H_{17}ClN_2S_2$.

Example 4

Octamethylenimine was used to prepare the slurry of this example. The product was stirred at 0°–10° C. for 30 minutes and isolated as described in Example 1. 5-chloro-2-(octahydro-1H-azonin-1-ylthio)benzothiazole was obtained in 88.5% yield as a light tan solid melting at 95°–96° C. after recrystallization from ethyl alcohol.

Analysis gave 8.60% nitrogen and 19.75% sulfur compared to 8.57% nitrogen and 19.62% sulfur calculated for $C_{15}H_{19}ClN_2S_2$.

Example 5

In this example the slurry comprised 53.0 grams (0.25 mole) of 6-ethoxy-2-mercaptobenzothiazole, 42.5 grams (0.375 mole) of heptamethylenimine, and 400 ml. of isopropyl alcohol. Two layers appeared upon addition of 50 ml. of water. The product was isolated substantially as described in Example 1. 6-ethoxy-2-(hexahydro-1(2H)-azocinylthio)benzothiazole was obtained in 85.5% yield as a green solid melting at 88°–89° C. after recrystallization from alcohol.

Analysis gave 8.86% nitrogen and 19.88% sulfur compared to 8.69% nitrogen and 18.89% sulfur calculated for $C_{16}H_{22}N_2OS_2$.

Example 6

The slurry comprised 53.0 grams (0.25 mole) of 6-ethoxy-2-mercaptobenzothiazole, 48 grams (0.375 mole) of octamethylenimine, and 300 ml. of isopropyl alcohol. 6-ethoxy-2-(octahydro-1H-azonin-1-ylthio)benzothiazole was obtained in 54.5% yield as a grey solid melting at 74°–75° C. after recrystallization from ethyl alcohol.

Analysis gave 8.57% nitrogen and 19.00% sulfur compared to 8.33% nitrogen and 19.05% sulfur calculated for $C_{17}H_{24}N_2OS_2$.

Rubbers in which the products of the present invention are useful as accelerators include both natural rubber and synthetic rubber. Rubber includes sulfur-vulcanizable diene polymers, preferably those containing a major proportion of diene polymer. Hydrocarbon diene rubbers are preferred but also useful are copolymers of diene hydrocarbons and acrylonitrile. Furthermore, isobutylene copolymerized with a small amount of diene (Butyl rubber) can be used in practice of the invention. Isoprene or butadiene-1,3 copolymers with vinyl monomers copolymerizable therewith, as for example styrene, and stereo specific rubbers like cis-1,4-polybutadiene are illustrative of the preferred diene rubbers. The invention will be further illustrated in connection with the data in the tables below.

A typical natural rubber tire tread stock was compounded by milling together the ingredients in the following base formula:

| | Parts by weight |
|---|---|
| Smoked sheets rubber | 100 |
| Carbon black | 50 |
| Zinc oxide | 5 |
| Stearic acid | 3 |
| Saturated hydrocarbon softener | 3 |
| Sulfur | 2.5 |
| Antioxidant | 1.0 |

To the above there was added in separate stocks 0.5 part of accelerator as follows:

Stock:
A -- 2-(hexahydro-1(2H)-azocinylthio)benzothiazole
B -- 2-(octahydro-1H-azonin-1-ylthio)benzothiazole The stocks so compounded were cured in the usual manner by heating in a press at 144° C. The modulus and tensile properties are recorded below:

TABLE I

| | Stock A | Stock B |
|---|---|---|
| Cure time in minutes | 50 | 60 |
| Modulus of elasticity in lbs./in.² at 300% elongation | 2,530 | 2,230 |
| Tensile at break in lbs./in.² | 3,500 | 3,000 |

The processing safety of the uncured composition was evaluated by means of a Mooney plastometer. The time required for incipient vulcanization or scorch was taken as the time required for the Mooney plasticity to rise 5 points above the minimum.

TABLE II

Stock: Mooney scorch in mins. at 135° C.
A ---------------------------------------- 12.6
B ---------------------------------------- 15.7

The Mooney scorch of a similar sock containing as the accelerator 0.5 part of 2-(hexahydro-1H-azepin-1-ylthio)benzothiazole was 11.1 minutes at 135° C.

As a further example of accelerating activity and processing safety, a rubber base composition containing a retarder of vulcanization was compounded comprising:

| | Parts by weight |
|---|---|
| Smoked sheets rubber | 100 |
| Carbon black | 50 |
| Zinc oxide | 5 |
| Stearic acid | 3 |
| Saturated hydrocarbon softener | 3 |
| Sulfur | 2.5 |
| N-nitrosodiphenylamine | 1 |
| Antioxidant | 1 |

To the above there was added in separate stocks 0.5 part of accelerator as follows:

Stock: Control
C ------- 2-(hexahydro-1H-azepin-1-ylthio)benzothiazole.

D ------- 2-(hexahydro-1(2H)-azocinylthio)benzothiazole.

E ------- 2-(octahydro-1H-azoninylthio)benzothiazole.

F ------- 5-chloro-2-(hexahydro-1(2H)-azocinylthio)benzothiazole.

G ------- 5-chloro-2-(octahydro-1H-azonin-1-ylthio)benzothiazole.

H ------- 6-ethoxy-2-(hexahydro-1(2H)-azocinylthio)benzothiazole.

J ------- 6-ethoxy-2-(octahydro-1H-azonin-1-ylthio)benzothiazole.

The above stocks so compound were cured in the usual manner by heating in a press at 144° C. The modulus and tensile properties of the vulcanizates and resistance of the unvulcanized compositions to scorch are set forth below.

TABLE III

| Stock | Cure time in minutes | Modulus of elasticity in lbs./in.² at 300% elongation | Tensile at break in lbs./in.² | Mooney scorch in mins. a 135° C. |
|---|---|---|---|---|
| C | 55 | 2,500 | 3,500 | 20.0 |
| D | 60 | 2,460 | 3,600 | 25.5 |
| E | 70 | 2,340 | 3,400 | 28.9 |
| F | 60 | 2,510 | 3,600 | 26.9 |
| G | 70 | 2,300 | 3,200 | 29.2 |
| H | 65 | 2,300 | 3,500 | 23.9 |
| J | 70 | 2,290 | 3,400 | 27.6 |

As illustrated of accelerating activity and processing safety in a synthetic rubber tire tread stock, butadiene-styrene copolymer rubber was blended in a standard formula as follows:

| | Parts by weight |
|---|---|
| SB-R 1500 | 100 |
| Carbon black | 50 |
| Zinc oxide | 4 |
| Stearic acid | 2 |
| Saturated hydrocarbon softener | 10 |
| Antioxidant | 1 |
| Sulfur | 1.75 |

To the above there was added in separate stocks 0.5 part of accelerator as follows:

Stock: Control
K ------- 2-(hexahydro-1H-azepin-1-ylthio)benzothiazole.

L ------- 2-(hexahydro-1(2H)-azocinylthio)benzothiazole.

M ------- 2-(octahydro-1H-azonin-1-ylthio)benzothiazole.

N ------- 5-chloro-2-(hexahydro-1(2H)-azocinylthio)benzothiazole.

O ------- 5-chloro-2-(octahydro-1H-azonin-1-ylthio)benzothiazole.

P ------- 6-ethoxy-2-(hexahydro-1(2H)-azocinylthio)benzothiazole.

Q ------- 6-ethoxy-2-(octahydro-1H-azonin-1-ylthio)benzothiazole.

Resistance to vulcanization at 135° C. of the stocks so compounded was determined as described above. The stocks were vulcanized by heating in a press at 153° C. The vulcanizates were tested for stress and tensile strength. The results are recorded in Table IV.

TABLE IV

| Stock | Cure time in minutes | Modulus of elasticity in lbs./in.² at 300% elongation | Tensile at break in lbs./in.² | Mooney scorch in mins. at 135° C. |
|---|---|---|---|---|
| K | 80 | 1,780 | 3,300 | 38.3 |
| L | 90 | 1,620 | 3,200 | 49.1 |
| M | 120 | 1,600 | 3,200 | 64.1 |
| N | 120 | 1,580 | 3,200 | 58.6 |
| O | 120 | 1,450 | 3,000 | 74.2 |
| P | 120 | 1,570 | 3,200 | 45.1 |
| Q | 120 | 1,460 | 3,000 | 57.1 |

To demonstrate the effectiveness of the accelerators of this invention in cis-polybutadiene, the rubber was compounded by milling together the ingredients in the following base formula:

|   | Parts by weight |
|---|---|
| Cis-1,4-polybutadiene | 100 |
| Carbon black | 50 |
| Aromatic oil softener | 10 |
| Zinc oxide | 3 |
| Stearic acid | 2 |
| Sulfur | 1.75 |

To the above there was added in separate stocks 0.5 part of accelerator as follows:

Stock:            Control
R            2-(Hexahydro-1H-azepin-1-ylthio) benzothiazole
S            2-(Hexahydro-1(2H)-azocinylthio) benzothiazole
T            2-(Octahydro-1H-azonin-1-ylthio) benzothiazole The processing safety of the uncured compositions was evaluated by means of a Mooney plastometer as described. The stocks were vulcanized by heating in the usual manner in a press at 144° C. The modulus and tensile properties are recorded below:

TABLE V

| Stock | Cure time in minutes | Modulus of elasticity in lbs./in.² at 300% elongation | Tensile at break in lbs./in.² | Mooney scorch in mins. at 135° C. |
|---|---|---|---|---|
| R | 75 | 780 | 2,100 | 18.5 |
| S | 105 | 740 | 2,100 | 27.9 |
| T | 130 | 700 | 1,900 | 39.8 |

Example 7

Bis(heptamethylenimino)disulfide(1,1' - dithiodiheptamethylenimine) was required in this example. The material was obtained by stirring a solution of 113.2 grams (1.0 mole) of heptamethylenimine and 400 ml. of ethyl ether while holding the temperature at 0°–10° C. during the addition, over a period one hour, of 33.8 grams (0.25 mole) of sulfur chloride in 100 ml. of ethyl ether. Then at this same temperature range 80 grams (0.5 mole) of 25% sodium hydroxide was added over a period of 15 minutes followed by the addition, concurrently, of 33.8 grams (0.25 mole) of sulfur chloride in 100 ml. of ethyl ether and 80 grams (0.5 mole) of 25% sodium hydroxide. After addition was complete, the reaction mixture was stirred at 0°–10° C. for 30 minutes, 250 ml. of water added, and stirring continued for 15 minutes. The ether layer was washed with water until the washings were neutral to litmus and dried over sodium sulfate. Ether was removed in vacuo at a maximum temperature of 30° C./1–2 mm. The product was obtained in 91% yield as an amber liquid.

Analysis gave 9.42% nitrogen compared to 9.71% nitrogen calculated for $C_{14}H_{28}N_2S_2$.

The desired product, 2-(hexahydro-1(2H)-azocinyl-dithio)benzothiazole, was prepared by mixing together 43.3 grams (0.15 mole) of 1,1'-dithiodiheptamethylenimine, 49.8 grams (0.15 mole) of 2-benzothiazolyl disulfide, and 600 ml. of isopropyl alcohol and heating the mixture at reflux for two hours and 15 minutes. The resulting solution was filtered hot to remove a small amount of impurities. After cooling to 25° C., 600 ml. of water and 700 ml. of ethyl ether were added and the mixture stirred for 15 minutes. The ether layer was washed with water until the washings were neutral to litmus and dried over sodium sulfate. The ether was removed in vacuo at a maximum temperature of 30° C./10–12 mm. The product, obtained in 94.5% yield, was a brown solid melting at 63°–64° C. after two recrystallizations from alcohol.

Analysis gave 8.57% nitrogen and 31.73% sulfur compared to 9.02% nitrogen and 30.98% sulfur calculated for $C_{14}H_{18}N_2S_3$.

Example 8

1,1'-dithiodioctamethylenimine required for this example was prepared as described in Example 7, first paragraph, but replacing the heptamethylenimine with an equimolar proportion of octamethylenimine. The said product was obtained in 92.2% yield as a yellow solid. After recrystallization from alcohol, it melted at 49°–50° C.

Analysis gave 8.72% nitrogen compared to the calculated value of 8.85% for $C_{16}H_{32}N_2S_2$.

To produce the desired 2-(octahydro-1H-azonin-1-yl-dithio)benzothiazole, 31.7 grams (0.1 mole) of bis(octamethylenimino)disulfide, 33.2 grams (0.1 mole) of 2-benzothiazolyl disulfide, and 400 ml. of isopropyl alcohol were stirred while heating at refluxing temperature for five hours. After cooling to 0° C. and holding at 0°–10° C. for one hour, the solids were collected and air-dried at 25°–30° C. The yield was 92.8% of a tan solid melting at 60°–61° C. after recrystallization from alcohol.

Analysis gave 8.49% nitrogen and 30.28% sulfur compared to 8.63% nitrogen and 29.64% sulfur calculated for $C_{15}H_{20}N_2S_3$.

Further illustrative of the accelerating properties of the polymethyleniminethio thiazoles of this invention, natural rubber stocks were compounded comprising:

| Stock | Parts by weight | |
|---|---|---|
|  | U | V |
| Smoked sheets rubber | 100 | 100 |
| Carbon black | 50 | 50 |
| Zinc oxide | 5 | 5 |
| Stearic acid | 3 | 3 |
| Saturated hydrocarbon softener | 3 | 3 |
| Sulfur | 2.5 | 2.5 |
| 2-(Hexahydro-1(2H)-azocinyldithio)-benzothiazole | 0.5 |  |
| 2-(Octahydro-1H-azonin-1-yl-dithio)-benzothiazole |  | 0.5 |

The stocks were cured for 45 minutes in a press at 144° C. The test results obtained were as follows:

TABLE VI

|   | U | V |
|---|---|---|
| Modulus of elasticity in lbs./in.² at 300% elongation | 2,200 | 1,970 |
| Tensile at break in lbs./in.² | 3,300 | 3,200 |
| Ultimate elongation, percent | 400 | 420 |
| Mooney scorch at 121° C. in minutes | 17.8 | 27.3 |

From the above data, it may readily be seen that the new compounds of this invention are effective accelerators of the vulcanization of rubbers and possess scorch resisting properties superior to the known 2-(hexahydro-1H-azepin-1-ylthio)benzothiazole.

The 2-polymethyleniminothiobenzothiazole heretofore known exhibited an induction period which increased with increased concentration of the accelerator. This permitted a degree of control by the compounds only if longer induction periods were desired. In natural rubber, gum stocks varying the concentration of hepta- and octamethyleniminothiobenzothiazoles from 1 to 6 millimoles per hundred of rubber decreased the induction period. In general, the amounts used to accelerate vulcanization will fall within the range of 0.1 to 5 parts by weight of accelerator per 100 parts by weight of rubber hydrocarbon.

It is intended to cover all changes and modifications of the examples of the invention herein chosen for purposes of disclosure which do not constitute departures from the spirit and scope of the invention.

What is claimed is:

1. A compound of the formula

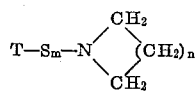

where T is selected from the group consisting of benzothiazolyl, nitro-, chloro-, lower alkyl-, and lower alkoxy-substituted benzothiazolyl, $m$ is an integer from one to two, inclusive, and $n$ is an integer from five to six, inclusive.

2. A compound of claim 1 where T is benzothiazolyl, $m$ is one, and $n$ is five.

3. A compound of claim 1 where T is benzothiazolyl, $m$ is one, and $n$ is six.

4. A compound of claim 1 where T is 5-chlorobenzothiazolyl, $m$ is one, and $n$ is five.

5. A compound of claim 1 wherein T is 5-chlorobenzothiazolyl, $m$ is one, and $n$ is six.

6. A compound of claim 1 where T is 6-ethoxybenzothiazolyl, $m$ is one, and $n$ is five.

7. A compound of claim 1 where T is 6-ethoxybenzothiazolyl, $m$ is one, and $n$ is six.

8. A compound of claim 1 where T is benzothiazolyl, $m$ is two, and $n$ is five.

9. A compound of claim 1 where T is benzothiazolyl, $m$ is two, and $n$ is six.

10. The process of vulcanizing a sulfur-vulcanizable hydrocarbon rubber which comprises heating at vulcanizing temperature rubber and sulfur in admixture with a small quantity sufficient to accelerate vulcanization of a product having the formula

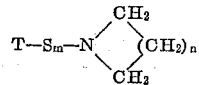

where T is selected from the group consisting of benzothiazolyl, nitro-, chloro-, lower alkyl-, and lower alkoxy-substituted benzothiazolyl, $m$ is an integer from one to two, inclusive, and $n$ is an integer from five to six, inclusive.

11. The process of claim 10 where T is benzothiazolyl, $m$ is one, and $n$ is five.

12. The process of claim 10 where T is benzothiazolyl, $m$ is one, and $n$ is six.

References Cited

UNITED STATES PATENTS 3,036,050   5/1962   D'Amico _____ 260—79.5

JAMES SEIDLECK, *Primary Examiner.*

U.S. Cl. X.R.

260—786, 306.6, 41.5, 23